US012468456B2

(12) United States Patent
Erb et al.

(10) Patent No.: US 12,468,456 B2
(45) Date of Patent: *Nov. 11, 2025

(54) SYSTEMS AND METHODS FOR SECURE STORAGE OF SENSITIVE DATA

(71) Applicant: Capital One Services, LLC, McLean, VA (US)

(72) Inventors: Carla S. Erb, Flower Mound, TX (US); Sheel Shah, Frederick, MD (US); James E. Deaver, II, Richmond, VA (US); Caleb J. Cockrill, Oakland, CA (US); Aaron Woodard, Glen Allen, VA (US); Samantha Bennett, Aubrey, TX (US); Christopher Halima, Woodbridge, VA (US); Andrew Moore, Richmond, VA (US); Daniel Hazeley, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/602,933

(22) Filed: Mar. 12, 2024

(65) Prior Publication Data

US 2024/0370184 A1    Nov. 7, 2024

Related U.S. Application Data

(63) Continuation of application No. 17/897,262, filed on Aug. 29, 2022, now Pat. No. 11,947,812.

(51) Int. Cl.
*G06F 3/06* (2006.01)

(52) U.S. Cl.
CPC .......... *G06F 3/0622* (2013.01); *G06F 3/0655* (2013.01); *G06F 3/0679* (2013.01)

(58) Field of Classification Search
None
See application file for complete search history.

(56) References Cited

U.S. PATENT DOCUMENTS 10,134,058 B2    11/2018  Dasdan et al.
10,484,387 B1    11/2019  Kenthapadi et al.
(Continued)

OTHER PUBLICATIONS

Extended European Search Report in related EP Application No. 23193995.0 mailed Jan. 8, 2024.

*Primary Examiner* — Edward J Dudek, Jr.
*Assistant Examiner* — Ralph A Verderamo, III
(74) *Attorney, Agent, or Firm* — TROUTMAN PEPPER LOCKE LLP; Christopher J. Forstner; John A. Morrissett

(57) ABSTRACT

A system including: one or more processors; a memory storing instructions that, when executed by the one or more processors are configured to cause the system to: receive a plurality of user names and a plurality of anonymized user identifiers; receive a plurality of user attributes associated with one or more users of the plurality of users; receive a first plurality of hash values that uniquely identify an association between each user attribute and one or more users; receive a first request for a listing of user names associated with a first user attribute; receive a first secret key; generate a second plurality of hash values; determine a first subset of the first plurality of hash values that match the second plurality of hash values; generate a first graphical user interface including the listing of user names; and transmit the first graphical user interface to the first user device.

20 Claims, 5 Drawing Sheets

(56) References Cited

U.S. PATENT DOCUMENTS

| | | |
|---|---|---|
| 11,947,812 B2 * | 4/2024 | Erb ................ G06F 3/0655 |
| 2015/0293923 A1 | 10/2015 | Eide et al. |
| 2017/0208041 A1 | 7/2017 | Kho et al. |
| 2018/0189660 A1 | 7/2018 | Malmi et al. |
| 2018/0218168 A1 | 8/2018 | Goel et al. |
| 2021/0390196 A1 | 12/2021 | Lavine et al. |
| 2022/0222373 A1 | 7/2022 | Villax et al. |
| 2022/0253555 A1 | 8/2022 | Chopra et al. |

\* cited by examiner

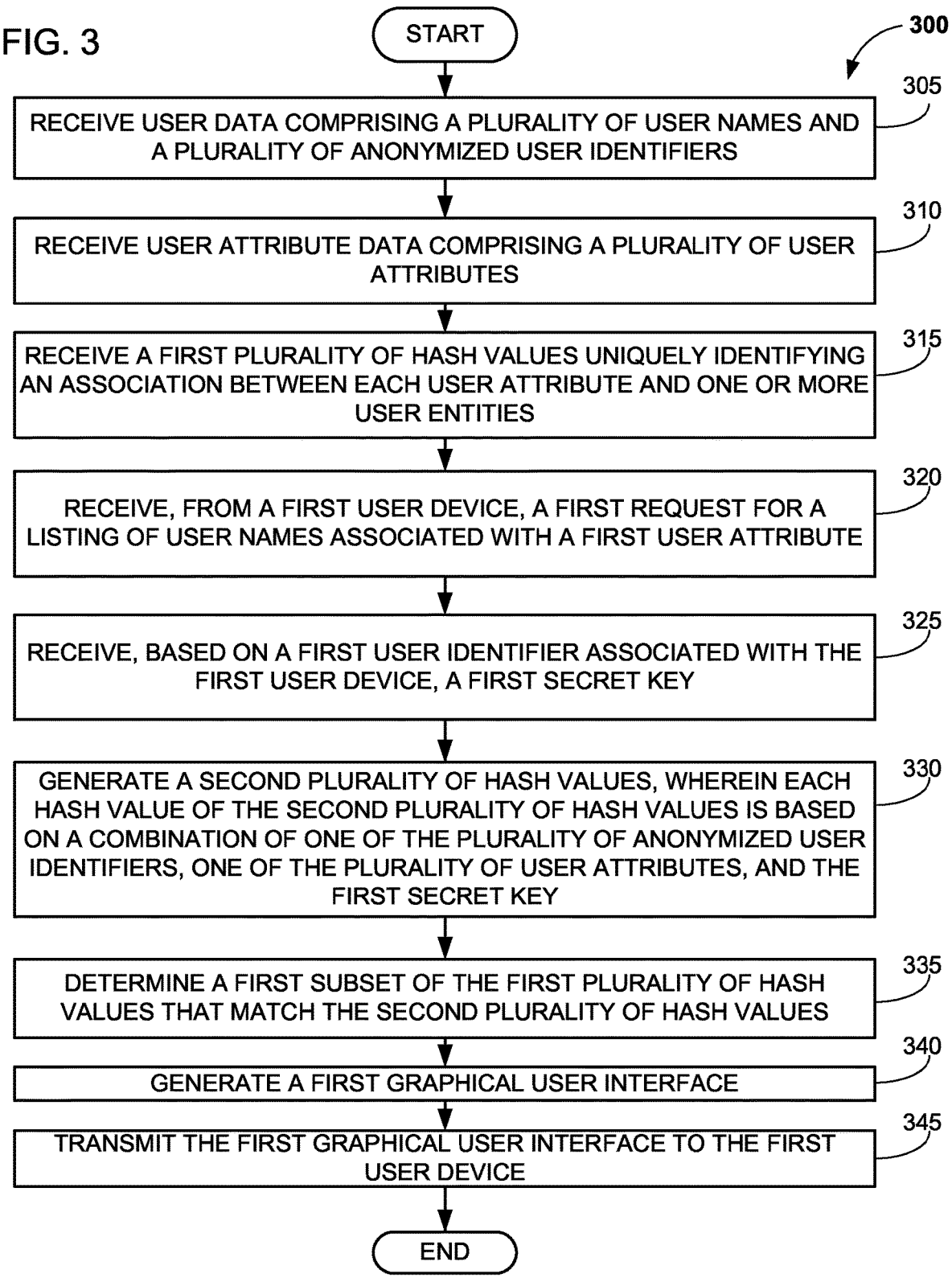

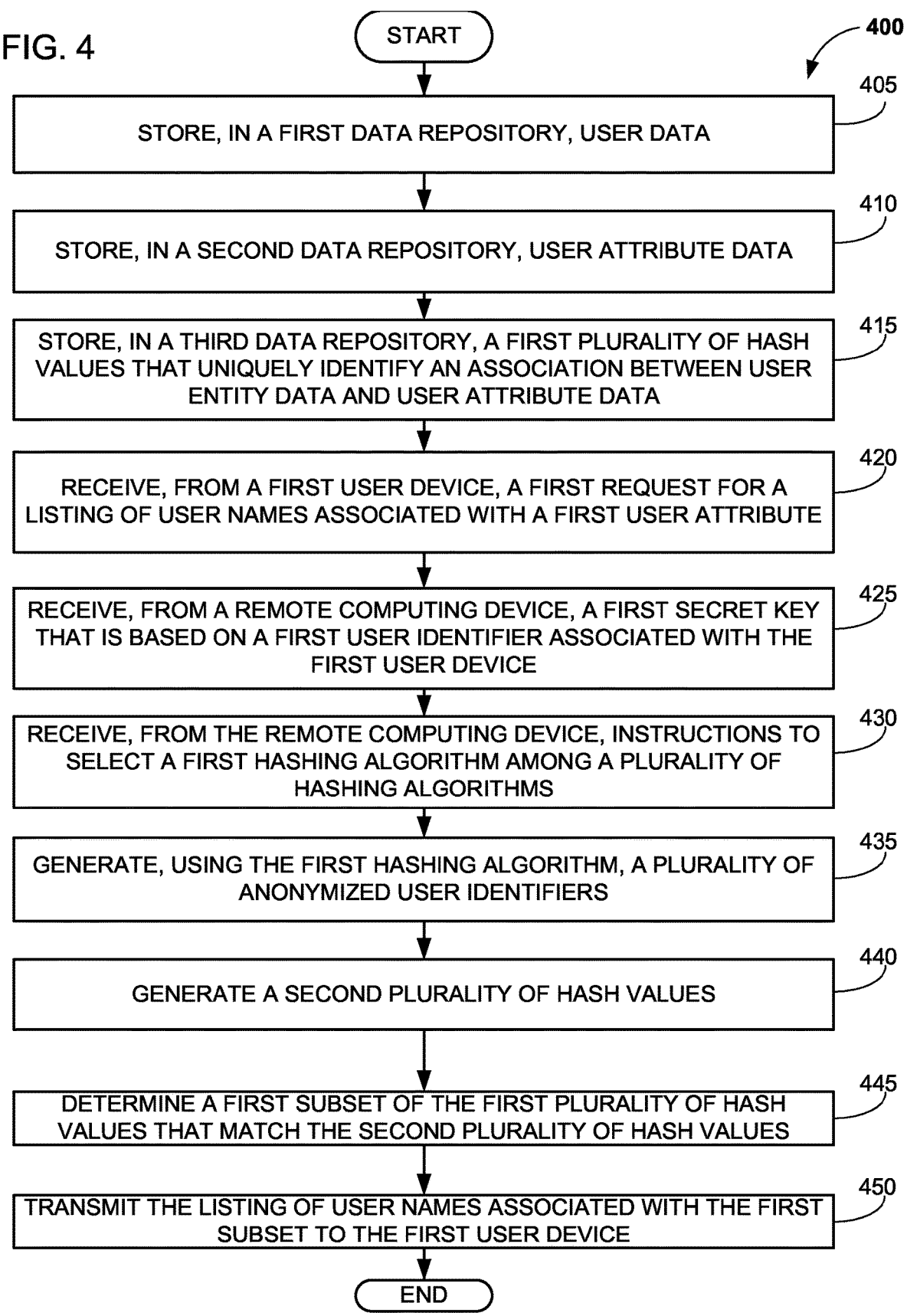

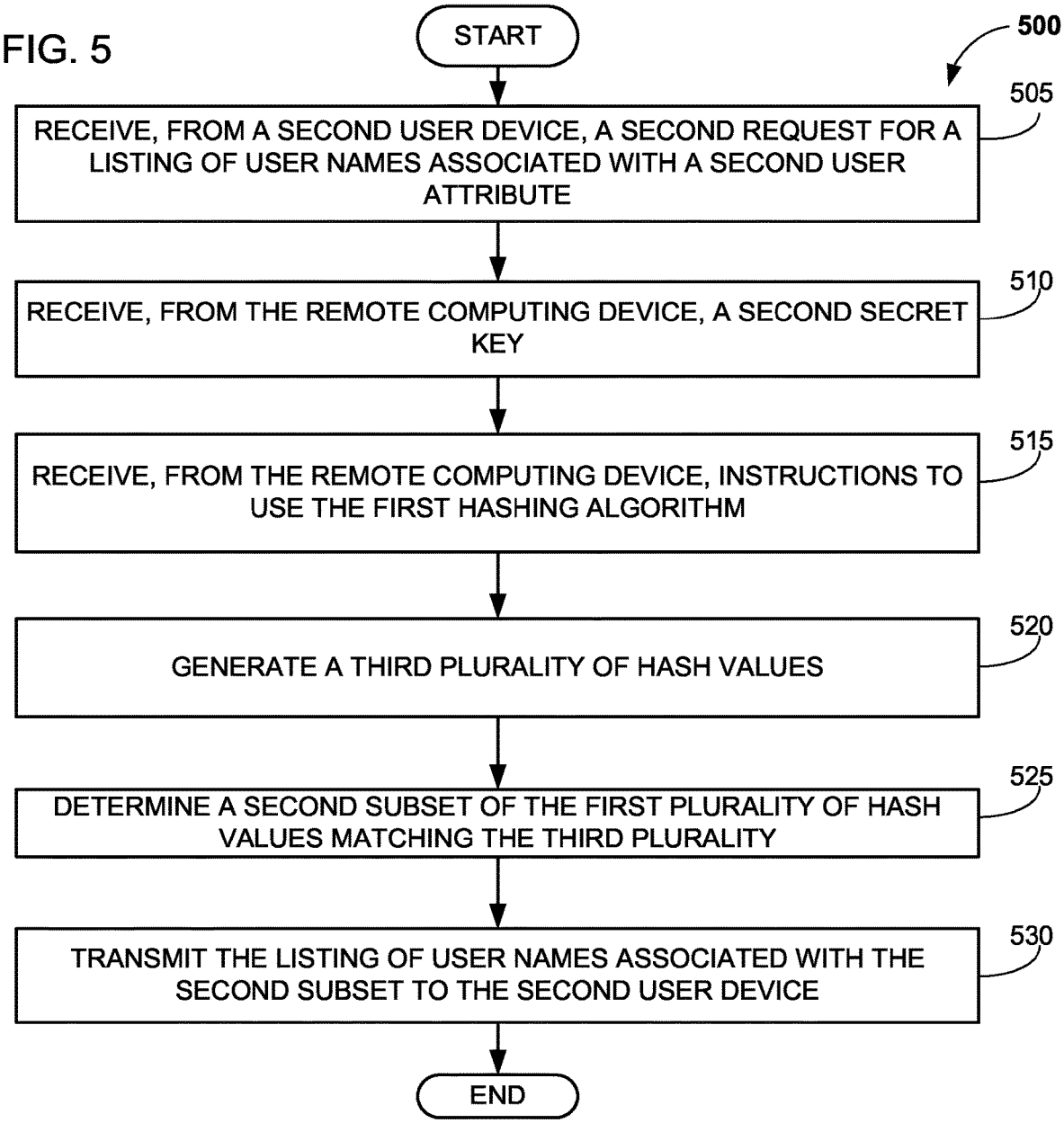

SYSTEMS AND METHODS FOR SECURE STORAGE OF SENSITIVE DATA

CROSS-REFERENCE TO RELATED APPLICATIONS

This application is a continuation of, and claims priority under 35 U.S.C. § 120 to, U.S. patent application Ser. No. 17/897,262, filed Aug. 29, 2022, the entire contents of which are fully incorporated herein by reference.

FIELD

The disclosed technology generally secure data storage, and more particularly systems and methods for securely storing sensitive information using hash value tables generated using a secret key to preserve data anonymity.

BACKGROUND

Organizations often utilize sensitive data in conducting business transactions and making business decisions that enhance customer satisfaction and enhance value provided to the customers. For example, sensitive information may be utilized internally by an organization to make decisions regarding offering new products, services, or promotions. Sensitive information may include financial information that may be considered personal identifiable information (PII), as well as other types of sensitive information such as medical information, marketing information, user cookies, metadata, etc.

However, an issue with organizations storing sensitive information is that if the server or virtual environment that stores the sensitive information is accessed by an external threat, all the sensitive information may potentially become compromised, exposing the organization to potential loss of customer confidence and legal actions, especially with the advent of consumer protection schemes, such as the general data protection regulation (GDPR) of Europe and the California Consumer Privacy Act (CCPA) of California.

Accordingly, a need exists for systems and methods that can securely store sensitive data by storing sensitive data as a hash of a user identifier, a user attribute, and a secret key that is generated by a separate server and/or virtual instance. Because the secret key is not stored locally to the sensitive information, an external threat that gains access to either the hash values or the secret key generator alone do not gain access to the stored sensitive data, thereby providing enhanced security for organizations that utilize and store sensitive data as part of their operations. The disclosed embodiments are directed to these and other considerations.

SUMMARY

Certain disclosed embodiments provide systems and methods for secure storage of sensitive data.

According to some embodiments, a system for secure storage of sensitive data is disclosed. The system may include one or more processors and a memory in communication with the one or more processors, storing instructions that when executed by the one or more processors are configured to cause the system to perform the steps of a method. The method may include receiving, at a first data repository, user data. The user data may include a plurality of user names associated with a plurality of users. The user data may additionally include a plurality of anonymized user identifiers. The method may include receiving, at a second data repository, user attribute data. The user attribute data may include a plurality of user attributes associated with one or more users of the plurality of users. The method may include receiving, at a third data repository, a first plurality of hash values that uniquely identify an association between each user attribute of the plurality of user attributes and one or more users of the plurality of users. The method may include, receiving, from a first user device, a first request for a listing of user names associated with a first user attribute. The method may include receiving, based on a first user identifier associated with the first user device, a first secret key. The method may include generating a second plurality of hash values. Each hash value of the second plurality of hash values may be based on a combination of one of the plurality of anonymized user identifiers, one of the plurality of use attributes, and the first secret key. The method may include determining a first subset of the first plurality of hash values that match the second plurality of hash values. In response to determining the first subset of the first plurality of hash values matching the second plurality of hash values, the method may include generating a first graphical user interface including the listing of user names associated with the first user attribute and transmitting the first graphical user interface to the first user device.

In another aspect, a system for secure storage of sensitive data is disclosed. The system may include one or more processors and a memory in communication with the one or more processors, storing instructions that when executed by the one or more processors are configured to cause the system to perform the steps of a method. The method may include storing, in a first data repository, user data. The user data may include a plurality of user names associated with a plurality of users. The method may include storing, in a second data repository, user attribute data. The user attribute data can include a plurality of user attributes that are each associated with one or more users of the plurality of users. The method may include storing, in a third data repository, a first plurality of hash values that uniquely identify an association between each user attribute of the plurality of user attributes and one or more users of the plurality of users. The method may include, receiving, from a first user device, a first request for a listing of user names associated with a first user attribute. The method may include receiving, from a remote computing device, a first secret key that is based on a first user identifier associated with the first user device. The method may include receiving, from the remote computing device, instructions to select a first hashing algorithm among a plurality of hashing algorithms, The method may include generating, using the first hashing algorithm, a plurality of anonymized user identifiers. The method may include generating a second plurality of hash values. Each hash value of the second plurality of hash values may be based on a combination of an anonymized user identifier of the plurality of anonymized user identifiers each associated with a user name of the plurality of user names, one of the plurality of user attributes, and the first secret key. The method may include determining a first subset of the first plurality of hash values that match the second plurality of hash values. The method may include transmitting the listing of user names associated with the first subset of the first plurality of hash values to the first user device.

In another aspect, a computer implemented method for securely storing sensitive data is disclosed. The method may include storing, in a first data repository, user data. The user data may include a plurality of user names that are associated with a plurality of users and a plurality of anonymized user identifiers. The method may include storing, in a second data repository, user attribute data. The user attribute data can include a plurality of user attributes associated with one or more users of the plurality of users. The method may include storing, in a third data repository, a first plurality of hash values that uniquely identify an association between each user attribute of the plurality of users attributes and one or more users of the plurality of users. The method may include receiving, from a first user device, a first request for a listing of user names associated with a first user attribute. The method may include, generating, at a remote computing device and based on the first user identifier associated with the first user device, a first secret key. The method may include generating a second plurality of hash values. Each hash value of the second plurality of hash values is based on a combination of one of the plurality of anonymized user identifiers, one of the plurality of user attributes, and the first secret key. The method may include determining a first subset of the first plurality of hash values that match the second plurality of hash values. The method may include transmitting the listing of user names associated with the first subset of the first plurality of hash values to the first user device.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 3 is a flowchart of a method of securely retrieving sensitive information based on a first user request, according to an example embodiment;

FIG. 4 is a flowchart of a method of securely retrieving sensitive information based on a first user request, according to an example embodiment; and FIG. 5 is a flowchart of a method of securely retrieving sensitive information based on a second user request, according to certain example embodiments.

DETAILED DESCRIPTION

Figure 1:
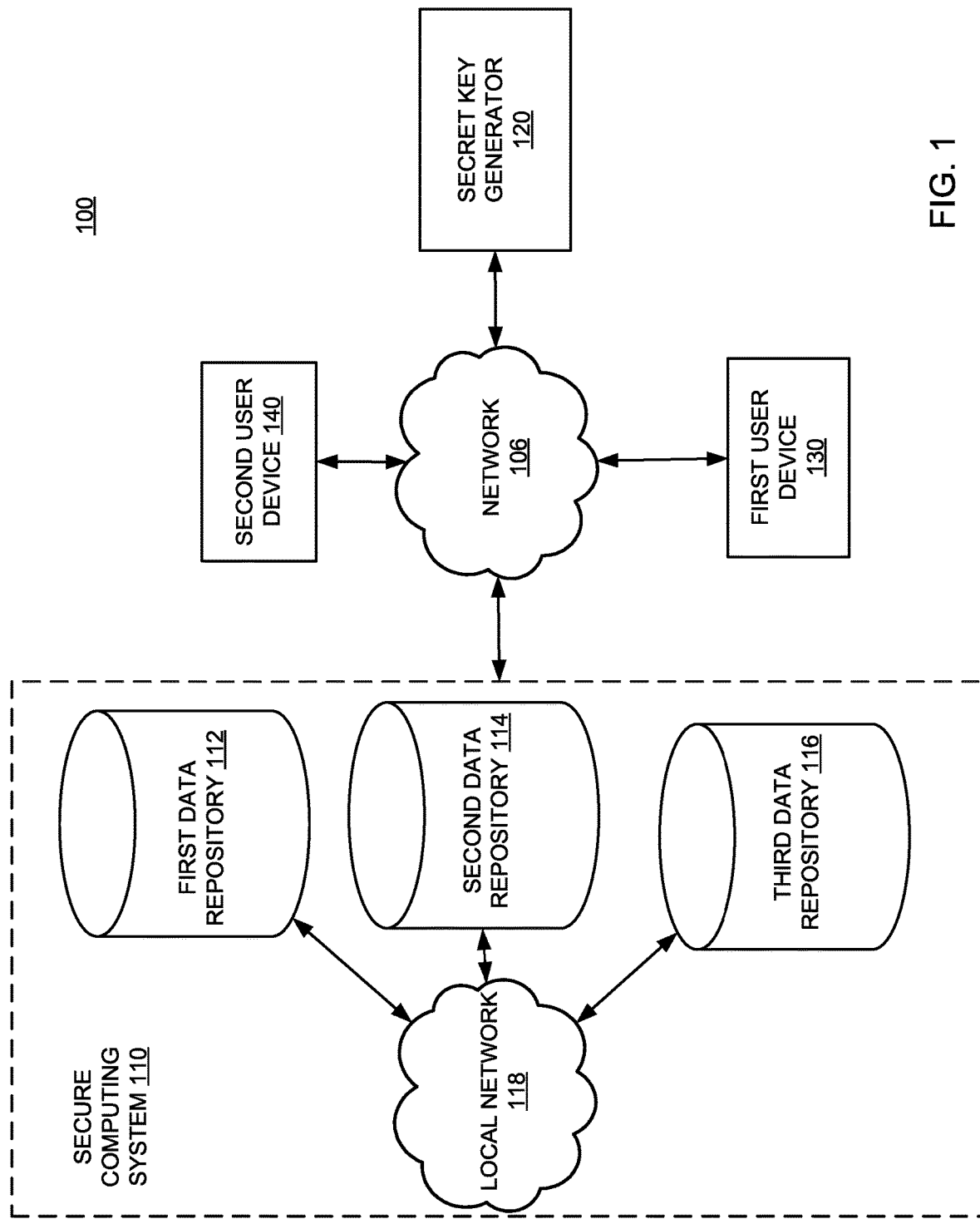
FIG. 1 is a diagram of an example system environment that may be used to implement one or more embodiments of the present disclosure.

Examples of the present disclosure generally include systems and methods for secure storage of sensitive data, and more particularly systems and methods for securely storing sensitive information using hash value tables generated using a secret key to preserve data anonymity. The systems and methods are able to generate secure hash values that are based on combinations of anonymized user identifiers, user attributes, and a secret key generated by a remote computing device or remote virtual instance, thereby allowing the system to securely store sensitive information in a way that the information is not compromised if an external actor gains access to the system that stores the sensitive information, but not the secret key generator, which can significantly increase the security associated with the secure storage of sensitive data.

The systems and methods described herein are necessarily rooted in computer technology as they relate to improving the functioning of secure data storage system systems. With prior secure data storage systems, sensitive information may be compromised if an external actor is able to gain access to the system storing the information. Instead, the present systems and methods retain the security of the stored data even if the system, but not the secret key generator, are accessed by an external actor. In some instances, utilizes a secret key generator that is operated on a separate network or computer system that provides a secret key to the system, which is used as part of an input combined with a user identifier and a user attribute identifier to generate a hash value that uniquely represents an association between a respective user and a respective user attribute. Current methods of secure data storage can be defeated if an external actor is able to access the system storing the information. The present system retains security as long as the external actor does not gain access to both the system and the secret key generator.

Throughout this disclosure, reference is made to instances, which can be understood to mean a "server instance" from a remote computing system. The remote computing system can be understood to be a private or public cloud computing platform. Certain vendors offer these type of cloud platforms, including but not limited to, Amazon EC2® and ECS®, Google Kubernetes Engine® clusters, and the like.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to example embodiments of the disclosed technology, examples of which are illustrated in the accompanying drawings and disclosed herein. Wherever convenient, the same references numbers will be used throughout the drawings to refer to the same or like parts.

In accordance with certain disclosed embodiments, system environment 100 may include a secure computing system 110 in communication with a secret key generator 120, a first user device 130, and a second user device 140 via network 106. Secure computing system 110 may be a computing device, such as a mobile computing device (e.g., a smart phone, tablet computer, smart wearable device, portable laptop computer, voice command device, wearable augmented reality device, or other mobile computing device) or fixed computing device (e.g., desktop computer).

An example architecture that may be used to implement one or more aspects of system 100 is described below with reference to FIG. 2.

According to some embodiments, secure computing system 110 may be a cloud computing platform. Secure computing system 110 may include a first data repository 112, a second data repository 114, and a third data repository 116, although in some embodiments, first data repository 112, second data repository 114, and third data repository 116 may be implemented as separate virtual cloud instances for added security. The data repositories 112, 114, and 116 may be connected either directly, or through a network (e.g., local network 118). Local network 118 may be of any suitable type, including individual connections via the internet such as cellular or Wi-Fi networks. Each of the first data repository 112, second data repository 114, and third data repository 116 may be used to store user data, user attributes, and hash values, respectively. In some cases, secure computing system 110 communicates with secret key generator to receive a secret key that allows the secure computing system to generate hash values that uniquely identify an association with user attributes and specific users of system 100. Additionally, secure computing system 110 may communicate with first user device 130, second user device 140, and nth user device, wherein n may be any number of user devices within system 100. First/second/nth user device may transmit a unique user device identifier to the secure computing system 110, which secure computing system 110 may use to request a user device specific secret key from secret key generator 120.

Each user device of the system (e.g., first user device 130, second user device 140, . . . , nth user device, etc.) may be operated by an individual operating within system 100, and may be utilized by each respective user to query the secure computing system to determine a subset of users that have associated user attributes. According to some embodiments, the secure computing system 110 does not directly store a list of users and their associated user attributes, and instead stores hash values (e.g., in third data repository 116) that the secure computing system 110 compares to hash values generated based on a logical combination of a secret key, a user identifier, and a user attribute. Matching hash values indicate that a particular user (e.g., a user associated with a respective user identifier) has an associated user attribute.

Network 106 may be of any suitable type, including individual connections via the internet such as cellular or Wi-Fi networks. In some embodiments, network 106 may connect terminals using direct connections such as radio-frequency identification (RFID), near-field communication (NFC), Bluetooth™, low-energy Bluetooth™ (BLE), Wi-Fi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security. One of ordinary skill will recognize that various changes and modifications may be made to system environment 100 while remaining within the scope of the present disclosure. For example, in some cases, distributed application status repository 130 may be implemented in "serverless" forms (e.g., executed within secure computing system 110). Moreover, while the various components have been discussed as distinct elements, this is merely an example, and, in some cases, various elements may be combined into one or more physical or logical systems.

Figure 2:
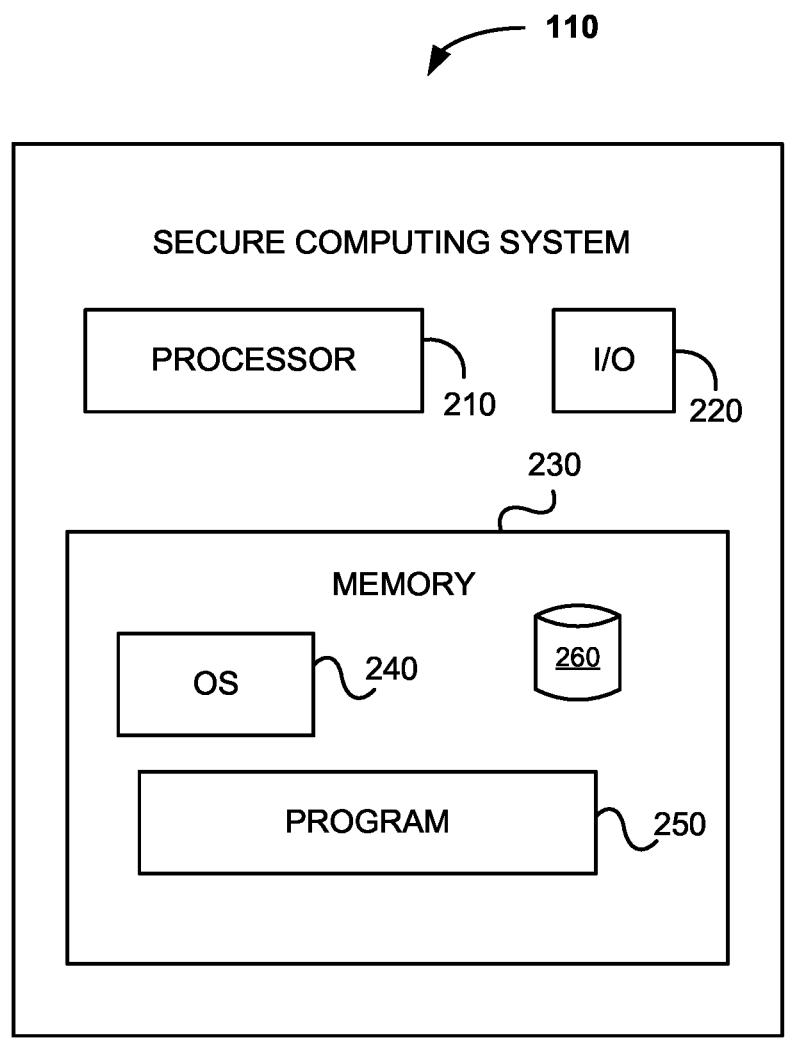
FIG. 2 is a block diagram of a secure computing system, according to an example embodiment.

FIG. 2 is a block diagram (with additional details) of the secure computing system 110, as also depicted in FIG. 1. According to some embodiments, first data repository 112, second data repository 114, third data repository 116, first user device 130, second user device 140, nth user device, and/or secret key generator 120, as depicted in FIG. 1, may have a similar structure and components that are similar to those described with respect to secure computing system 110 shown in FIG. 2. As shown, the secure computing system 110 may include a processor 210, an input/output ("I/O") device 220, a memory 230 containing an operating system ("OS") 240 and a program 250. In certain example implementations, the secure computing system 110 may be a single server or may be configured as a distributed computer system including multiple servers or computers that interoperate to perform one or more of the processes and functionalities associated with the disclosed embodiments. In some embodiments, the secure computing system 110 may further include a peripheral interface, a transceiver, a mobile network interface in communication with the processor 210, a bus configured to facilitate communication between the various components of the secure computing system 110, and a power source configured to power one or more components of the secure computing system 110.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the secure computing system 110 may include one or more storage devices configured to store information used by the processor 210 (or other components) to perform certain functions related to the disclosed embodiments. In one example, the secure computing system 110 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the secure computing system 110 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the secure computing system 110 may include the memory 230 that may include one or more programs 250 to perform one or more functions of the disclosed embodiments. For example, in some embodiments, the secure computing system 110 may additionally generate hash values to compare against hash values stored within third data repository 116 to determine a listing of users that are associated with a respective user attribute via program 250.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL Server, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a database 260 for storing related data to enable the secure computing system 110 to perform one or more of the processes and functionalities associated with the disclosed embodiments.

Database 260 may include stored data relating to a user device identifier for each respective user device operating within system 100. Database 260, according to some embodiments, may locally store information stored within first data repository 112, second data repository 114, and/or third data repository.

The secure computing system 110 may also be communicatively connected to one or more memory devices (e.g., databases) locally or through a network. The remote memory devices may be configured to store information and may be accessed and/or managed by the secure computing system 110. By way of example, the remote memory devices may be document management systems, Microsoft™ SQL Server, SharePoint™ databases, Oracle™ databases, Sybase™ databases, or other relational or non-relational databases. Systems and methods consistent with disclosed embodiments, however, are not limited to separate databases or even to the use of a database.

The secure computing system 110 may also include one or more I/O devices 220 that may comprise one or more interfaces for receiving signals or input from devices and providing signals or output to one or more devices that allow data to be received and/or transmitted by the secure computing system 110. For example, the secure computing system 110 may include interface components, which may provide interfaces to one or more input devices, such as one or more keyboards, mouse devices, touch screens, track pads, trackballs, scroll wheels, digital cameras, microphones, sensors, and the like, that enable the secure computing system 110 to receive data from one or more data repositories (e.g., 112, 114, and/or 116), the first/second/nth user device, and/or the secret key generator 120.

In example embodiments of the disclosed technology, the secure computing system 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the secure computing system 110 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the secure computing system 110 may include a greater or lesser number of components than those illustrated.

FIG. 3 is a flowchart 300 of a method of securely retrieving sensitive information based on a first user request, according to an example embodiment. Referring to FIG. 3, in block 305 the system (e.g., secure computing system 110) may include receiving user data. The user data may include a plurality of user names and a plurality of anonymized user identifiers. For example, user data may be stored in first data repository 112, and may be used to determine a listing of users that have certain associated user attributes. The anonymized user identifiers may be of any type, for example, the anonymized user identifier may be a hash value that is based on an input of a respective user name of a respective user. In some embodiments, other methods of user name anonymization may be used in place of a hash value to generate the plurality of anonymized user identifiers. According to some embodiments, the secure computing system 110 may receive instructions from secret key generator 120 that instruct secure computing system 110 to use a particular hashing algorithm of a plurality of available hashing algorithms in order to generate the anonymized user identifiers. In block 310, the system (e.g., secure computing system 110) may receive user attribute data. The user attribute data can include a plurality of user attributes. For example, a user attribute can be "has an American Express Credit card," "uses online banking," "has more than 2 credit cards," "has a home mortgage," "has an automotive loan," "is a home renter," or any other user attribute that includes personally identifiable information or potentially sensitive user information, such as financial information. According to some embodiments, user attribute data can be stored on second data repository 114. In block 315, the system may receive a first plurality of hash values. Each of the first plurality of hash values may uniquely identify an association between a user attribute and a user entity, or one or more user entities. For example, the first plurality of hash values may be stored on third data repository 116. Secure computing system 110 may use the received plurality of hash values as a lookup table in order to determine whether a respective user of system 100 has associated a respective user attribute.

In block 320, the system (e.g., secure computing system 110) may receive, from a first user device (e.g., first user device 130), a first request for a listing of user names associated with a first user attribute. For example, a first user may want to know how many users of system 100 are homeowners. Accordingly, the first request may include an identifier of the user attribute in question (e.g., "is a homeowner"). The identifier of the user attribute may the user attribute itself, but in some embodiments, the user attribute may be anonymized in a manner similar to the anonymized user names from block 305.

In block 325, the system (e.g., secure computing system 110) may receive a first secret key (e.g., from secret key generator 120). According to some embodiments, the secret key may be specific to the user device making the request (e.g., the first user device 130, second user device 140, and/or nth user device). For example, the user device making the request (e.g., first user device 130) may transmit to the secure computing system 110 a first device identifier. The first device identifier may be passed to the secret key generator (e.g., secret key generator 130), which may return a secret key to secure computing system 110 that is specific to the first user device. According to some embodiments, each secret key may grant the respective user device (e.g., first user device 130) access to only a subset of user data. For example, a first user device may be granted only access to a subset of user attributes, such that a request for a listing of user names associated with a user attribute outside of the subset will not be returned to the first user device. Accordingly, information may be segregated based on which user within system 100 is requesting information. In other embodiments, each user device is granted the same secret key such that information is not segregated based on which user within system 100 is requesting information. Accordingly, in such embodiments, any user within system 100 may request a listing of users associated with any user attribute stored within system 100 (e.g., within third data repository 116 of secure computing system 110).

In block 330, the system (e.g., secure computing system 110) may generate a second plurality of hash values. Each value of the second plurality of hash values may be based on a combination of one of the anonymized user identifiers, one of the plurality of user attributes, and the first secret key. Accordingly, the secure computing system 110 may generate a hash value for each combination of anonymized user entity identifier and user attribute combined with the first secret key. According to some embodiments, rather than using an anonymized user entity identifier, the system (e.g., secure computing system 110) may be configured to generate the second plurality of hash values using a combination of one of the user names (non-anonymized), one of the user attributes, and the secret key.

In block 335, the system (e.g., secure computing system 110) may determine a first subset of the first plurality of hash values that match the second plurality of hash values. For example, secure computing system 110 may compare each of the second plurality of hash values generated in block 330 with the first plurality of hash values stored on the system 100 (e.g., in third data repository 116). Accordingly, the system (e.g., secure computing system 110) may identify a number of first hash values (e.g., the first subset of first hash values) that correspond to the generated second plurality of hash values.

In block 340, the system may generate a first graphical user interface that includes a listing of user names associated with the first user attribute. For example, based on the match between the first subset of first hash values and the second plurality of hash values generated in block 330, the system may determine a listing of user names that correspond to the user attribute requested by the first user in block 320. Accordingly, in block 345, the system (e.g., secure computing system 110) may transmit the first graphical user interface to the first user device in response to the first request received by the system in block 320.

FIG. 4 is a flowchart 400 of a method of securely retrieving sensitive information based on a first user request, according to an example embodiment. Blocks 405, 410, 415, 420, 440, 445, and 450 are substantially similar to blocks 305, 310, 315, 320, 330, 335, and 345, respectively. Accordingly, a full description of blocks 405, 410, 415, 420, 440, 445, and 450 are omitted here for brevity. Referring to FIG. 4, in block 425, the system may receive, from a remote computing device, a first secret key that is based on a first user identifier associated with the first user device. For example, the remote computing device may be secret key generator 120, which is a separate device (or virtual instance/cloud service) with respect to secure computing system 110. Accordingly, an external threat that gains access to only one of the secret key generator 120 and/or secure computing system 110 will not be able to gain access to the sensitive information stored on components of secure computing system 110. According to some embodiments, the first secret key may be customized for the first user device based on a first user identifier associated with the first user device. For example, the first user device (e.g., first user device 130) may transmit the first user device identifier directly to the secret key generator, while in other embodiments, the first request sent to the secure computing system 110 may include the first user identifier, and the secure computing system 110 may pass the first user identifier to the remote device (e.g., secret key generator 120). In yet other embodiments, a single secret key may be used regardless of the user device that requests a listing of user names associated with a user attribute. The purpose of segregating secret keys according to the user device identifier is to selectively allow access to the sensitive information stored on secure computing system 110 based on the user role or user credentials of each user within the system. For example, a high level administrator of system 100 may be given access to more highly sensitive information than a lower level administrator of system 100.

In block 430, the system (e.g., secure computing device 110) may receive, from the remote computing device (e.g., secret key generator 120), instructions to select a first hashing algorithm from among a plurality of hashing algorithms. Secret key generator 120 may provide an additional level of security by remotely storing instructions regarding which hashing algorithm of a plurality of available hashing algorithms the secure computing system 110 should use in generating one or more of the anonymized user identifiers and the plurality of hash values that represent the association between user attributes and user names. Without knowledge of which hashing algorithm to use, which is independently stored on secret key generator 120, an external actor cannot generate the appropriate hash values to access sensitive data that is stored on secure computing system 110.

In block 435, the system (e.g., secure computing system 110) may generate, using the first hashing algorithm, a plurality of anonymized user identifiers. For example, after receiving instructions to select the first hashing algorithm from among a plurality of available hashing algorithms, the system (e.g., secure computing system 110) may use the selected hashing algorithm to generate an anonymized user identifier for each user name stored on the system (e.g., on first data repository 112). According to some embodiments, the second plurality of hash values are generated based on a combination of the anonymized user identifiers, the secret key, and the user attributes. Accordingly, an external actor needs access to the anonymized user identifiers, the secret key, and the user attributes to access the sensitive information on secure computing system 110. By storing the instructions for which hashing algorithm to use separately from the secure computing system 110 (e.g., on secret key generator 120), the security of system 100 is greatly improved because an external actor cannot access the sensitive information without access to both secret key generator 120 and secure computing system 110.

FIG. 5 is a flowchart 500 of a method of securely retrieving sensitive information based on a second user request, according to certain example embodiments. Blocks 515, 520, 525, and 530 are substantially similar to blocks 430, 330, 335, and 345, respectively. Accordingly, a full description of block 515, 520, 525, and 530 are omitted here for brevity. Referring to FIG. 5, in block 505, In block 510, the system (e.g., secure computing system 110) may receive, from the remote computing device (e.g., secret key generator 120), a second secret key. The second secret key may be specific to the second user identifier associated with the second user device. According to some embodiments, the second secret key may be customized for the second user device based on a second user identifier associated with the second user device. For example, the second user device (e.g., second user device 140) may transmit the second user device identifier directly to the secret key generator, while in other embodiments, the second request sent to the secure computing system 110 may include the second user identifier, and the secure computing system 110 may pass the second user identifier to the remote device (e.g., secret key generator 120). In yet other embodiments, a single secret key may be used regardless of the user device that requests a listing of user names associated with a user attribute. The purpose of segregating secret keys according to the user device identifier is to selectively allow access to the sensitive information stored on secure computing system 110 based on the user role or user credentials of each user within the system. For example, a high level administrator of system 100 may be given access to more highly sensitive information than a lower level administrator of system 100.

Example Use Cases

The following example use cases describe examples of a use of systems and methods for secure storage of sensitive data. These example use cases are intended solely for explanatory purposes and not for limitation. In one case, an organization may wish to securely store sensitive data associated with users within the organization. For example, the organization may be a financial services provider and the sensitive data may include data such as which members of the organization have a certain type of credit account (e.g., a cash rewards credit card and/or a travel rewards credit card). The financial service provider may wish to collect such data on their employees while maximizing security and minimizing a potential data leak or data hack that exposes employee sensitive information. Accordingly, rather than storing such information directly, user names of the employees may be stored in a first data repository (e.g., data repository 112), user attributes may be stored in a second data repository (e.g., second data repository 114), and hash values that uniquely associate user attributes with respective users may be stored on a third data repository (e.g., third data repository 116). Even if an external actor is able to gain access to any of the repositories, no sensitive information is disclosed without further access to the secret key generator. When an administrator would like to use the collected sensitive information, the administrator may query the system to determine which users have a particular associated user attribute. A secret key may be received from the secret key generator, and a plurality of hash values are generated based on a combination of each user name, each user attribute, and the secret key. The generated plurality of hash values are compared to the hash values stored on the third data repository. For every match between the generated plurality of hash values and the stored plurality of hash values, a user name is returned to the administrator making the request, with each user name being associated with a user that has the associated user attribute.

Examples of the present disclosure can be implemented according to at least the following clauses:

Clause 1: A system for secure storage of sensitive data, the system comprising: one or more processors; and a memory in communication with the one or more processors, and storing instructions that when executed by the one or more processors are configured to cause the system to: receive, at a first data repository, user data comprising a plurality of user names associated with a plurality of users, and a plurality of anonymized user identifiers; receive, at a second data repository, user attribute data comprising a plurality of user attributes associated with one or more users of the plurality of users; receive, at a third data repository, a first plurality of hash values uniquely identifying an association between each user attribute of the plurality of user attributes and one or more users of the plurality of users; receive, from a first user device, a first request for a listing of user names associated with a first user attribute; receive, based on a first user identifier associated with the first user device, a first secret key; generate a second plurality of hash values, wherein each hash value of the second plurality of hash values is based on a combination of one of the plurality of anonymized user identifiers, one of the plurality of user attributes, and the first secret key; determine a first subset of the first plurality of hash values that match the second plurality of hash values; responsive to determining the first subset of the first plurality of hash values matching the second plurality of hash values, generate a first graphical user interface comprising the listing of user names associated with the first user attribute; and transmit the first graphical user interface to the first user device.

Clause 2: The system of clause 1, wherein the memory stores instructions that when executed by the one or more processors, are configured to cause the system to: receive, from a second user device, a second request for a listing of user names associated with a second user attribute; receive, based on a second user identifier associated with the second user device, a second secret key; generate a third plurality of hash values, wherein each hash value of the third plurality of hash values is based on a combination of one of the plurality of anonymized user identifiers, one of the plurality of user attributes, and the second secret key; determine a second subset of the first plurality of hash values that match the third plurality of hash values; responsive to determining the second subset of the first plurality of hash values matching the third plurality of hash values, generate a second graphical user interface comprising the listing of user names associated with the second user attribute; and provide the second graphical user interface to the second user device.

Clause 3: The system of clause 2, wherein the first secret key is unique to the first user device and is configured to provide the first user device access only to data associated with the first user attribute.

Clause 4: The system of clause 2, wherein the second secret key is unique to the second user device and is configured to provide the second user device access only to data associated with the second user attribute.

Clause 5: The system of clause 2, wherein the first secret key comprises a hash value that is based on an input of the first user identifier and the second secret key comprises a hash value that is based on an input of the second user identifier.

Clause 6: The system of clause 2, wherein the first secret key and the second secret key are generated by a remote computing device that is remote from each of the first data repository, the second data repository, and the third data repository.

Clause 7: The system of clause 6, wherein the memory stores instructions that when executed by the one or more processors, are configured to cause the system to: receive, responsive to the first request and the second request, instructions to use a specific hashing algorithm to generate the second plurality of hash values and the third plurality of hash values.

Clause 8: The system of clause 6, wherein an input order necessary to generate each of the second plurality of hash values and the third plurality of hash values is stored on the remote computing device.

Clause 9: A system for secure storage of sensitive data, the system comprising: one or more processors; and a memory in communication with the one or more processors, and storing instructions that when executed by the one or more processors are configured to cause the system to: store, in a first data repository, user data comprising a plurality of user names associated with a plurality of users; store, in a second data repository, user attribute data comprising a plurality of user attributes each associated with one or more users of the plurality of users; store, in a third data repository, a first plurality of hash values that uniquely identify an association between each user attribute of the plurality of user attributes and one or more users of the plurality of users; receive, from a first user device, a first request for a listing of user names associated with a first user attribute; receive, from a remote computing device, a first secret key that is based on a first user identifier associated with the first user device; receive, from the remote computing device, instructions to select a first hashing algorithm among a plurality of hashing algorithms; generate, using the first hashing algorithm, a plurality of anonymized user identifiers; generate a second plurality of hash values, wherein each hash value of the second plurality of hash values is based on a combination of an anonymized user identifier of the plurality of anonymized user identifiers each associated with a user name of the plurality of user names, one of the plurality of user attributes, and the first secret key; determine a first subset of the first plurality of hash values that match the second plurality of hash values; and transmit the listing of user names associated with the first subset of the first plurality of hash values to the first user device.

Clause 10: The system of claim 9, wherein the memory stores instructions that when executed by the one or more processors, are configured to cause the system to: receive, from a second user device, a second request for a listing of user names associated with a second user attribute; receive, from the remote computing device, a second secret key that is based on a second user identifier associated with the second user device; receive, from the remote computing device, instructions to use the first hashing algorithm; generate a third plurality of hash values, wherein each hash value of the third plurality of hash values is based on a combination of an anonymized user identifier of the plurality of anonymized user identifiers each associated with a user name of the plurality of user names, one of the plurality of user attributes, and the second secret key; determine a second subset of the first plurality of hash values that match the third plurality of hash values; and transmit the listing of user names associated with the second subset of the first plurality of hash values to the second user device.

Clause 11: The system of clause 10, wherein the first secret key is unique to the first user device and is configured to provide the first user device access only to data associated with the first user attribute.

Clause 12: The system of clause 10, wherein the second secret key is unique to the second user device and is configured to provide the second user device access only to data associated with the second user attribute.

Clause 13: The system of clause 10, wherein the first secret key comprises a hash value that is based on an input of the first user identifier and the second secret key comprises a hash value that is based on an input of the second user identifier.

Clause 14: The system of clause 10, wherein the remote computing device is remote from each of the first data repository, the second data repository, and the third data repository.

Clause 15: The system of clause 14, wherein the memory stores instructions that when executed by the one or more processors, are configured to cause the system to: receive, responsive to the first request and the second request, instructions to use the first hashing algorithm to generate the second plurality of hash values and the third plurality of hash values.

Clause 16: The system of clause 14, wherein an input order necessary to generate each of the second plurality of hash values and the third plurality of hash values is stored on the remote computing device and provided to the system in response each of the first request and the second request.

Clause 17: A computer implemented method for securely storing sensitive data, the method comprising: storing, in a first data repository, user data comprising a plurality of user names associated with a plurality of users and a plurality of anonymized user identifiers; storing, in a second data repository, user attribute data comprising a plurality of user attributes associated with one or more users of the plurality of users; storing, in a third data repository, a first plurality of hash values uniquely identifying an association between each user attribute of the plurality of user attributes and one or more users of the plurality of users; receiving, from a first user device, a first request for a listing of user names associated with a first user attribute; generating, at a remote computing device and based on a first user identifier associated with the first user device, a first secret key; generating a second plurality of hash values, wherein each hash value of the second plurality of hash values is based on a combination of one of the plurality of anonymized user identifiers, one of the plurality of user attributes, and the first secret key; determining a first subset of the first plurality of hash values that match the second plurality of hash values; and transmitting the listing of user names associated with the first subset of the first plurality of hash values to the first user device.

Clause 18: The computer implemented method of clause 17, further comprising: receiving, from a second user device, a second request for a listing of user names associated with a second user attribute; generating, at the remote computing device and based on a second user identifier associated with the second user device, a second secret key; generating a third plurality of hash values, wherein each hash value of the third plurality of hash values is based on a combination of one of the plurality of anonymized user identifiers, one of the plurality of user attributes, and the second secret key; determining a second subset of the first plurality of hash values that match the third plurality of hash values; and transmitting the listing of user names associated with the second subset of the first plurality of hash values to the second user device.

Clause 19: The method of clause 18, wherein the first secret key is unique to the first user device and is configured to provide the first user device access only to data associated with the first user attribute and the second secret key is unique to the second user device and is configured to provide the second user device access only to data associated with the second user attribute.

Clause 20: The method of clause 18, wherein the remote computing device is remote from each of the first data repository, the second data repository, and the third data repository.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   one or more processors; and
   a memory in communication with the one or more processors, and storing instructions that when executed by the one or more processors are configured to cause the system to:
   receive user data comprising a plurality of user names associated with a plurality of users and a plurality of anonymized user identifiers;
   receive user attribute data comprising a plurality of user attributes associated with one or more users of the plurality of users;
   receive a first plurality of hash values uniquely identifying an association between each user attribute of the plurality of user attributes and one or more users of the plurality of users;
   receive, from a first computing device, a first request for a listing of user names associated with a first user attribute;
   receive, based on a first user identifier, a first secret key;
   generate a second plurality of hash values, wherein each hash value of the second plurality of hash values is based on a combination of one of the plurality of anonymized user identifiers, one of the plurality of user attributes, and the first secret key;
   determine a first subset of the first plurality of hash values that match the second plurality of hash values; and
   transmit the listing of user names associated with the first user attribute to the first computing device.

2. The system of claim 1, wherein the memory stores instructions that when executed by the one or more processors, are configured to cause the system to:
   responsive to determining the first subset of the first plurality of hash values matching the second plurality of hash values, generate a first graphical user interface comprising the listing of user names associated with the first user attribute;
   transmit the first graphical user interface to the first computing device;

receive, from a second computing device, a second request for a listing of user names associated with a second user attribute;
receive, based on a second user identifier associated with the second computing device, a second secret key;
generate a third plurality of hash values, wherein each hash value of the third plurality of hash values is based on a combination of one of the plurality of anonymized user identifiers, one of the plurality of user attributes, and the second secret key;
determine a second subset of the first plurality of hash values that match the third plurality of hash values;
responsive to determining the second subset of the first plurality of hash values matching the third plurality of hash values, generate a second graphical user interface comprising the listing of user names associated with the second user attribute; and
provide the second graphical user interface to the second computing device.

3. The system of claim 2, wherein the first secret key is unique to the first computing device and is configured to provide the first computing device access only to data associated with the first user attribute.

4. The system of claim 2, wherein the second secret key is unique to the second computing device and is configured to provide the second computing device access only to data associated with the second user attribute.

5. The system of claim 2, wherein the first secret key comprises a hash value that is based on an input of the first user identifier and the second secret key comprises a hash value that is based on an input of the second user identifier.

6. The system of claim 2, wherein the first secret key and the second secret key are generated by a remote computing device that is remote from each of a first data repository, a second data repository, and a third data repository.

7. The system of claim 6, wherein the memory stores instructions that when executed by the one or more processors, are configured to cause the system to:
receive, responsive to the first request and the second request, instructions to use a specific hashing algorithm to generate the second plurality of hash values and the third plurality of hash values.

8. The system of claim 6, wherein an input order necessary to generate each of the second plurality of hash values and the third plurality of hash values is stored on the remote computing device.

9. A system comprising:
one or more processors; and
a memory in communication with the one or more processors, and storing instructions that when executed by the one or more processors are configured to cause the system to:
store, a first plurality of hash values that uniquely identify an association between each user attribute of a plurality of user attributes and one or more users of a plurality of users;
receive, from a first computing device, a first request for a listing of user names associated with a first user attribute;
receive a first secret key that is based on a first user identifier associated with the first computing device;
generate, using a first hashing algorithm, a plurality of anonymized user identifiers;
generate a second plurality of hash values, wherein each hash value of the second plurality of hash values is based on a combination of an anonymized user identifier of a plurality of anonymized user identifiers each associated with a user name of a plurality of user names, one of the plurality of user attributes, and the first secret key;
determine a first subset of the first plurality of hash values that match the second plurality of hash values; and
transmit the listing of user names associated with the first subset of the first plurality of hash values to the first computing device.

10. The system of claim 9, wherein the memory stores instructions that when executed by the one or more processors, are configured to cause the system to:
store, in a first data repository, user data comprising the plurality of user names associated with the plurality of users;
store, in a second data repository, user attribute data comprising the plurality of user attributes each associated with one or more users of the plurality of users;
receive, from a second computing device, a second request for a listing of user names associated with a second user attribute;
receive a second secret key that is based on a second user identifier associated with the second computing device;
receive instructions to use the first hashing algorithm;
generate a third plurality of hash values, wherein each hash value of the third plurality of hash values is based on a combination of an anonymized user identifier of the plurality of anonymized user identifiers each associated with a user name of the plurality of user names, one of the plurality of user attributes, and the second secret key;
determine a second subset of the first plurality of hash values that match the third plurality of hash values; and
transmit the listing of user names associated with the second subset of the first plurality of hash values to the second computing device.

11. The system of claim 10, wherein the first secret key is unique to the first computing device and is configured to provide the first computing device access only to data associated with the first user attribute.

12. The system of claim 10, wherein the second secret key is unique to the second computing device and is configured to provide the second computing device access only to data associated with the second user attribute.

13. The system of claim 10, wherein the first secret key comprises a hash value that is based on an input of the first user identifier and the second secret key comprises a hash value that is based on an input of the second user identifier.

14. The system of claim 10, wherein a remote computing device is remote from each of the first data repository, the second data repository, and a third data repository.

15. The system of claim 14, wherein the memory stores instructions that when executed by the one or more processors, are configured to cause the system to:
receive, responsive to the first request and the second request, instructions to use the first hashing algorithm to generate the second plurality of hash values and the third plurality of hash values.

16. The system of claim 14, wherein an input order necessary to generate each of the second plurality of hash values and the third plurality of hash values is stored on the remote computing device and provided to the system in response each of the first request and the second request.

17. A computer implemented method comprising:
storing a first plurality of hash values uniquely identifying an association between each user attribute of a plurality of user attributes and one or more users of a plurality of users;
receiving, from a first computing device, a first request for a listing of user names associated with a first user attribute;
generating, based on a first user identifier associated with the first computing device, a first secret key;
generating a second plurality of hash values, wherein each hash value of the second plurality of hash values is based on a combination of one of the plurality of anonymized user identifiers, one of the plurality of user attributes, and the first secret key;
determining a first subset of the first plurality of hash values that match the second plurality of hash values; and
transmitting the listing of user names associated with the first subset of the first plurality of hash values to the first computing device.

18. The computer implemented method of claim 17, further comprising:
storing, in a first data repository, user data comprising the plurality of user names associated with the plurality of users and the plurality of anonymized user identifiers;
storing, in a second data repository, user attribute data comprising the plurality of user attributes associated with one or more users of the plurality of users;
receiving, from a second computing device, a second request for a listing of user names associated with a second user attribute;
generating, based on a second user identifier associated with the second computing device, a second secret key;
generating a third plurality of hash values, wherein each hash value of the third plurality of hash values is based on a combination of one of the plurality of anonymized user identifiers, one of the plurality of user attributes, and the second secret key;
determining a second subset of the first plurality of hash values that match the third plurality of hash values; and
transmitting the listing of user names associated with the second subset of the first plurality of hash values to the second computing device.

19. The method of claim 18, wherein the first secret key is unique to the first computing device and is configured to provide the first computing device access only to data associated with the first user attribute and the second secret key is unique to the second computing device and is configured to provide the second computing device access only to data associated with the second user attribute.

20. The method of claim 18, wherein a remote computing device is remote from each of the first data repository, the second data repository, and a third data repository.

\* \* \* \* \*